US007287625B1

(12) United States Patent
Harris

(10) Patent No.: US 7,287,625 B1
(45) Date of Patent: Oct. 30, 2007

(54) FORKLIFT SAFETY SENSOR AND CONTROL SYSTEM

(76) Inventor: Brian L. Harris, 3915 Trailstone La., Katy, TX (US) 77494

( * ) Notice: Subject to any disclaimer, the term of this patent is extended or adjusted under 35 U.S.C. 154(b) by 408 days.

(21) Appl. No.: 11/051,535

(22) Filed: Feb. 4, 2005

Related U.S. Application Data

(60) Provisional application No. 60/546,110, filed on Feb. 19, 2004.

(51) Int. Cl.
*B66F 9/06* (2006.01)
*B60P 1/44* (2006.01)
*B66B 1/24* (2006.01)

(52) U.S. Cl. ...................... 187/282; 187/237; 187/284; 187/291; 414/629; 414/785

(58) Field of Classification Search ..................... None
See application file for complete search history.

(56) References Cited

U.S. PATENT DOCUMENTS 4,182,126 A 1/1980 Blakeslee
4,231,450 A 11/1980 Hedtke et al.
4,265,337 A * 5/1981 Dammeyer ................. 187/224
4,411,582 A * 10/1983 Nakada ...................... 187/222
4,596,507 A * 6/1986 Quinn ........................ 414/785
4,598,797 A 7/1986 Schultz
4,849,735 A 7/1989 Kirtley et al.
5,068,791 A * 11/1991 Klopfleisch et al. ........ 318/587
5,068,792 A * 11/1991 Lehr et al. .................... 701/37
5,131,801 A 7/1992 Melanson
5,319,352 A 6/1994 Robertson et al.
5,749,696 A 5/1998 Johnson
6,138,795 A 10/2000 Kamiya
6,345,694 B1 2/2002 Volker
6,883,299 B1 * 4/2005 Gramm ................... 56/10.2 E
2002/0190849 A1 12/2002 Orzechowski
2007/0080025 A1 * 4/2007 Yamada et al. ............. 187/224

FOREIGN PATENT DOCUMENTS

DE 10207017 A1 * 8/2003
EP 0943582 A2 9/1999
JP 2001128526 A * 5/2001

OTHER PUBLICATIONS

"ASME/ANSI'S Safety Standard Zeros In On the Danger Zone," Cascade Kenhar, 2 pages, 2001.
"OSHA, Industrial Truck Association from Alliance, Will focus on safe operation of powered industrial trucks," U.S. Department of Labor, OSHA Trade News Release, 2 pages, Jan. 15, 2004.

* cited by examiner

*Primary Examiner*—Lincoln Donovan
*Assistant Examiner*—Eduardo Colon Santana
(74) *Attorney, Agent, or Firm*—Steven W. Smith

(57) ABSTRACT

A forklift safety sensor and control system for preventing unsafe wear on the bottom surface of the fork. A fork height sensor detects when the fork is below a predefined threshold height at which the bottom surface is in close proximity to the ground or is in contact with the ground. The sensor sends a height signal to a system controller. In response, the controller sends a lockout signal to a lockout device, which prevents the forklift's drive mechanism from moving the forklift relative to the ground. The controller may also send an alert to the driver. When the fork is raised above the threshold height, the lockout is removed.

18 Claims, 2 Drawing Sheets

FORKLIFT SAFETY SENSOR AND CONTROL SYSTEM

PRIORITY STATEMENT UNDER 35 U.S.C. § 119(e) & 37 C.F.R. § 1.78

This non-provisional application claims priority based upon the prior U.S. provisional patent application entitled, "Forklift Safety Sensor and Control System", application No. 60/546,110, filed Feb. 19, 2004 in the name of Brian L. Harris.

BACKGROUND OF THE INVENTION

1. Technical Field of the Invention

This invention relates to industrial forklift trucks. More particularly, and not by way of limitation, the invention is directed to a forklift safety sensor and control system for preventing unsafe wear on the tines of the fork.

2. Description of Related Art

After setting down a load, forklift drivers often back up and then drive a considerable distance with the bottom surface of the tines of the fork contacting the ground. This causes excessive wear of the tines. Over a period of time, the tines are ground down until the thickness of the tines becomes a safety problem. The forklift may be rated to lift loads of a particular weight, but the thickness of the tines of the fork have been ground down to the point that they are not capable of holding the weight to which the forklift has been rated. The area where the fork makes a right angle from the vertical to the horizontal is referred to as the "heel" of the fork. The heel is a critical area for the load-carrying capacity of the fork. As little as a ten percent loss of metal through wear on the bottom surface of the heel reduces the lifting capacity of the fork by twenty percent. Severe injury and property damage may result if one or both of the tines fails under a heavy load.

OSHA has restrictions and guidelines regarding excessive wear on the tines of forklift forks (see ASME/ANSI B56.1D-1993). The thickness of the tines may be measured utilizing fork calipers specially designed for this function. Often, however, because of the expense of the forks, operators of forklifts may not replace the forks, even when the measured thickness of the tines is less than the OSHA guidelines. Thus, the current efforts to prevent this unsafe condition are not effective.

SUMMARY OF THE INVENTION

It is an object of the present invention to provide a forklift safety sensor and control system for preventing unsafe wear on the tines of the fork. By preventing the wear on the tines from ever happening, the problem of excessive wear is eliminated. The invention provides a sensor that senses the vertical position of the fork (and/or carriage), and a controller that restricts movement of the forklift, in either the forward or reverse direction, if the tines of the fork are contacting the ground, or are in such close proximity to the ground that they are likely to bounce off the ground when the forklift is driven over rough ground.

In one aspect, the present invention is directed to a control system for preventing wear on a bottom surface of a fork utilized on a vehicle to lift and carry loads. The vehicle includes a drive mechanism that causes the vehicle to move relative to the ground. The control system includes a sensor, a controller, and a lockout device. The sensor detects when the fork is at a height at which a bottom surface of the fork is in contact with the ground and sends a signal to the controller. The controller receives the signal from the sensor indicating that the fork is at the height at which the bottom surface is in contact with the ground, and sends a lockout signal to the lockout device. Upon receiving the lockout signal, the lockout device prevents the drive mechanism from moving the vehicle.

In another aspect, the present invention is directed to a method of preventing wear on a bottom surface of a fork utilized on a vehicle to lift and carry loads. The method includes the steps of detecting with a sensor, when the fork is at a height below a predefined threshold height; sending a signal from the sensor to a controller indicating that the fork is below the predefined threshold height; and preventing the vehicle from moving relative to the ground when the fork is below the predefined threshold height. The predefined threshold height may be a height at which the bottom surface of the fork is in contact with the ground, or may be a height at which the bottom surface of the fork is in close proximity to the ground.

In yet another aspect, the present invention is directed to a system controller for preventing wear on a bottom surface of a fork utilized on a vehicle to lift and carry loads. The system controller includes means for receiving a height signal from a fork height sensor indicating that the height of the fork is below a predefined threshold height; and means responsive to the height signal for sending a lockout signal to a lockout device that prevents the vehicle from moving relative to the ground.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EXEMPLARY EMBODIMENTS

The present invention locks out the drive system of an industrial lift vehicle such as a forklift when a sensor detects that the height of the fork is below a threshold level. Although the exemplary description herein discusses the invention in terms of a forklift, it should be recognized that the invention is applicable to any material handling equipment that utilizes forks. This includes units that are powered by gasoline, LPG, butane, propane, diesel, natural gas, batteries, or any other suitable power source.

The present invention is a control system that includes a sensor that senses the height of the fork above the ground and sends a signal to a controller that activates a lockout device to restrict the forklift drive system when the fork is below a threshold height. Thus, if the fork is in contact with the ground, or in close proximity to the ground, the forklift is prevented from moving. This prevents the driver from inadvertently grinding down the tines by driving the forklift with the tines in contact with the ground, or with the tines so close to the ground that they hit the ground when the forklift bounces.

Figure 1A:
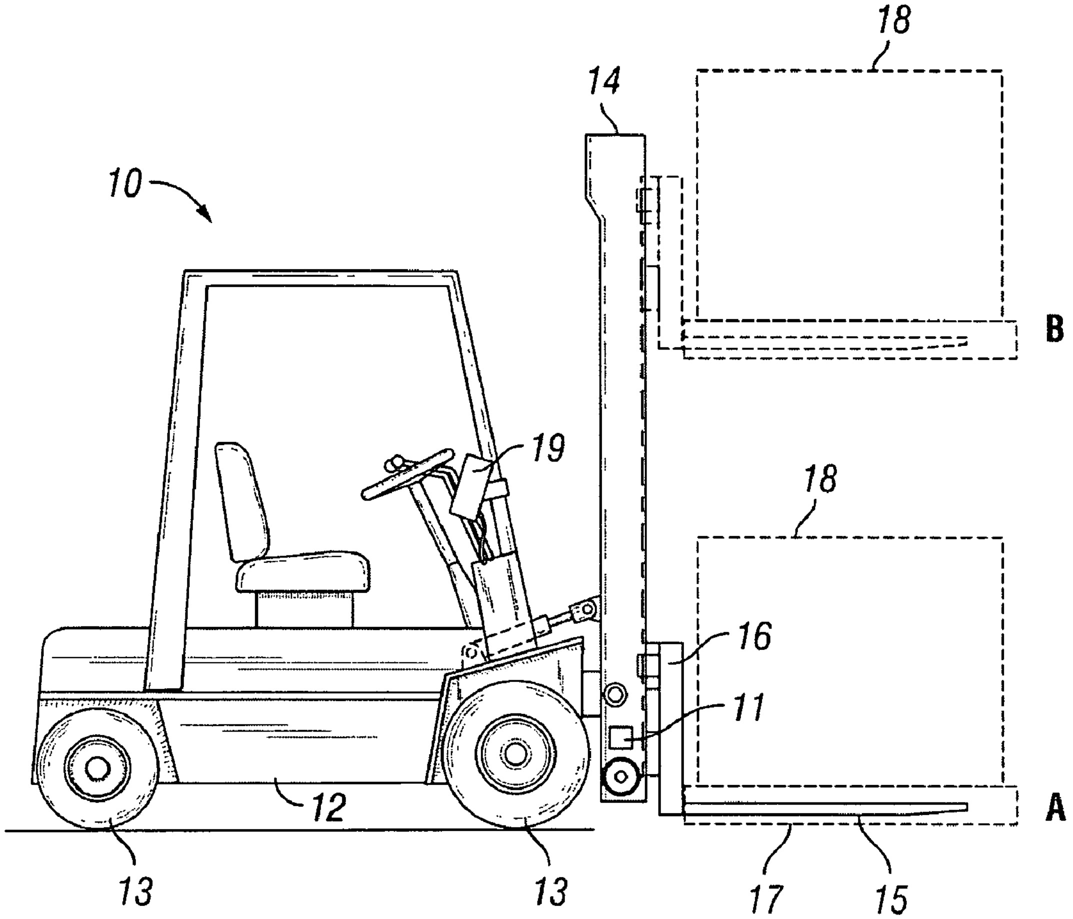
FIG. 1A is a side view of a forklift illustrating the positioning of the fork height sensor in one embodiment of the present invention.

FIG. 1A is a side view of a forklift 10 illustrating the positioning of the fork height sensor 11 in one embodiment of the present invention. The forklift includes a chassis 12 having powered wheels 13 for moving the forklift. Mounted to the forward end of the chassis is a mast 14. A fork comprising a pair of adjacent fork tines 15 is mounted on a carriage 16, which slides up and down the mast. In forklifts, a pair of inner masts (or carriage) is supported in a pair of outer masts. The carriage slides up and down in the outer masts, and the fork moves with the carriage. As is known in the art, the fork tines 15 may be inserted within a pallet 17, which supports a load 18 (both shown in phantom). The fork may thereafter be raised from the fully lowered position A to the fully raised position B, or to any intermediate position. The forklift may also include a driver information panel 19 showing the status of the forklift and providing the driver with alerts or warnings necessary for safe operation of the forklift.

The fork height sensor 11 may be mounted on the forklift mast 14 and may determine the height of the fork tines 15 by sensing the relative height of the carriage 16 to the outer masts. Alternatively, a contact sensor may be mounted on the "heel" of the fork tine, or a proximity sensor may be utilized.

The fork height sensor 11 may be electronic, magnetic, optical, mechanical, or any other suitable technology for sensing the height of the fork 15 or carriage 16 of the forklift. In one embodiment, for example, the sensor may be a photo electronic sensor. A first sensor part is mounted to the vertical mast 14, and a second sensor is mounted to the moving carriage 16. The relative positions of the sensors indicate the height of the carriage, and consequently, the height of the fork. For example, the sensors may be positioned so that they are adjacent to each other when the fork is in contact with the ground, or is very close to the ground. This configuration may also be utilized with magnetic sensors, which generate an electrical signal when they come in close proximity to each other and their magnetic fields are disturbed.

In another embodiment, the fork height sensor 11 may be an optical sensor such as a photo eye. The sensor may be mounted, for example, on the chassis 12 of the forklift behind the mast 14. The carriage 16 may include markings on its rear side that are detected by the sensor as the carriage moves up and down. One such mark may indicate that the carriage is fully lowered and, therefore, the tines of the fork are touching the ground.

In another embodiment, the fork height sensor 11 may be a mechanical switch. The switch may be mounted, for example, on the mast 14, and the carriage 16 may include a mechanical actuator that actuates the switch when the carriage is fully lowered. Of course, the opposite is also true, and the switch may be mounted on the carriage, and the mast may include a mechanical actuator that actuates the switch when the carriage is fully lowered.

In another embodiment, mechanical switches or proximity switches such as radio frequency (RF) proximity switches may be mounted in a position to monitor the height of the fork 15 or carriage 16. Such sensors may be mounted on the mast 14, the carriage 16, or the fork 15 itself, and may detect proximity to a predefined portion of the mast or carriage, or to the ground.

Figure 1B:
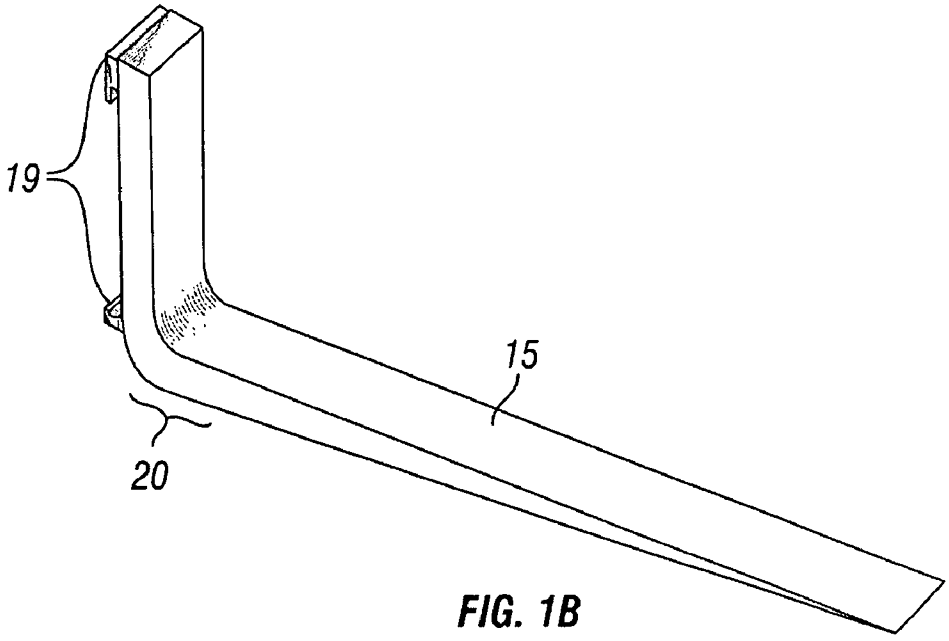
FIG. 1B is a perspective view of one of the fork tines of FIG. 1A.

FIG. 1B is a perspective view of one of the fork tines 15 FIG. 1A. The fork tine connects to the carriage 16 through two check hooks 19. The area 20 where the fork makes a right angle from the vertical to the horizontal is referred to as the "heel" of the fork. The heel is a critical area for the load-carrying capacity of the fork. As little as a ten percent loss of metal through wear on the bottom surface of the heel reduces the lifting capacity of the fork by twenty percent.

Figure 2:
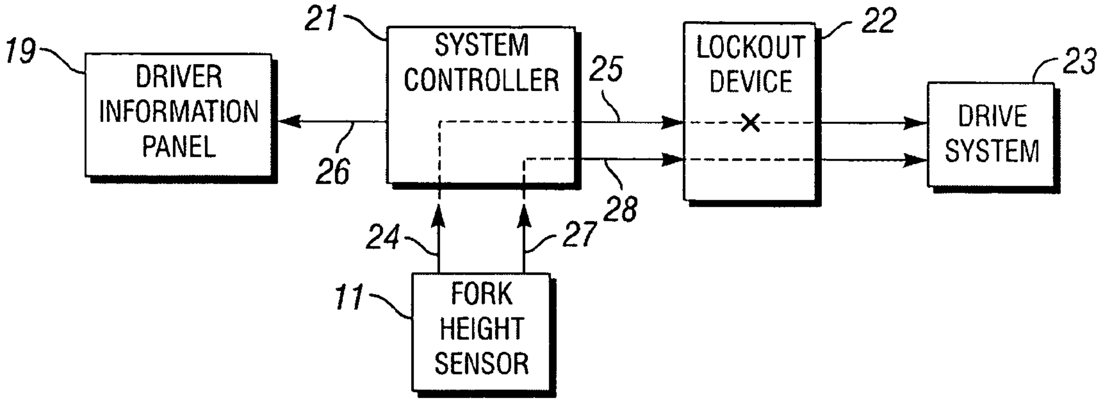
FIG. 2 is a simplified block diagram of the preferred embodiment of the system of the present invention.

FIG. 2 is a simplified block diagram of the preferred embodiment of the system of the present invention. The system may include the fork height sensor 11, the information panel 19, a system controller 21, a lockout device 22, and a drive system 23. The fork height sensor may operate with the controller in a normally open or normally closed system. The lockout device 22 may be any suitable electronic or mechanical device, which prevents the driver from moving the forklift. In one embodiment suitable for forklifts with internal combustion engines, the linkage to the carburetor or the fuel injection system is locked out so that pressing on the accelerator does not cause the engine to accelerate. In another embodiment, a mechanical lockout such as a solenoid and locking pin may physically prevent the accelerator pedal from being depressed. In another embodiment, the forklift's gearbox is disengaged so that no power is provided to the wheels 13. In yet another embodiment, the lockout device engages a safety brake that prevents the wheels from turning.

Figure 3:
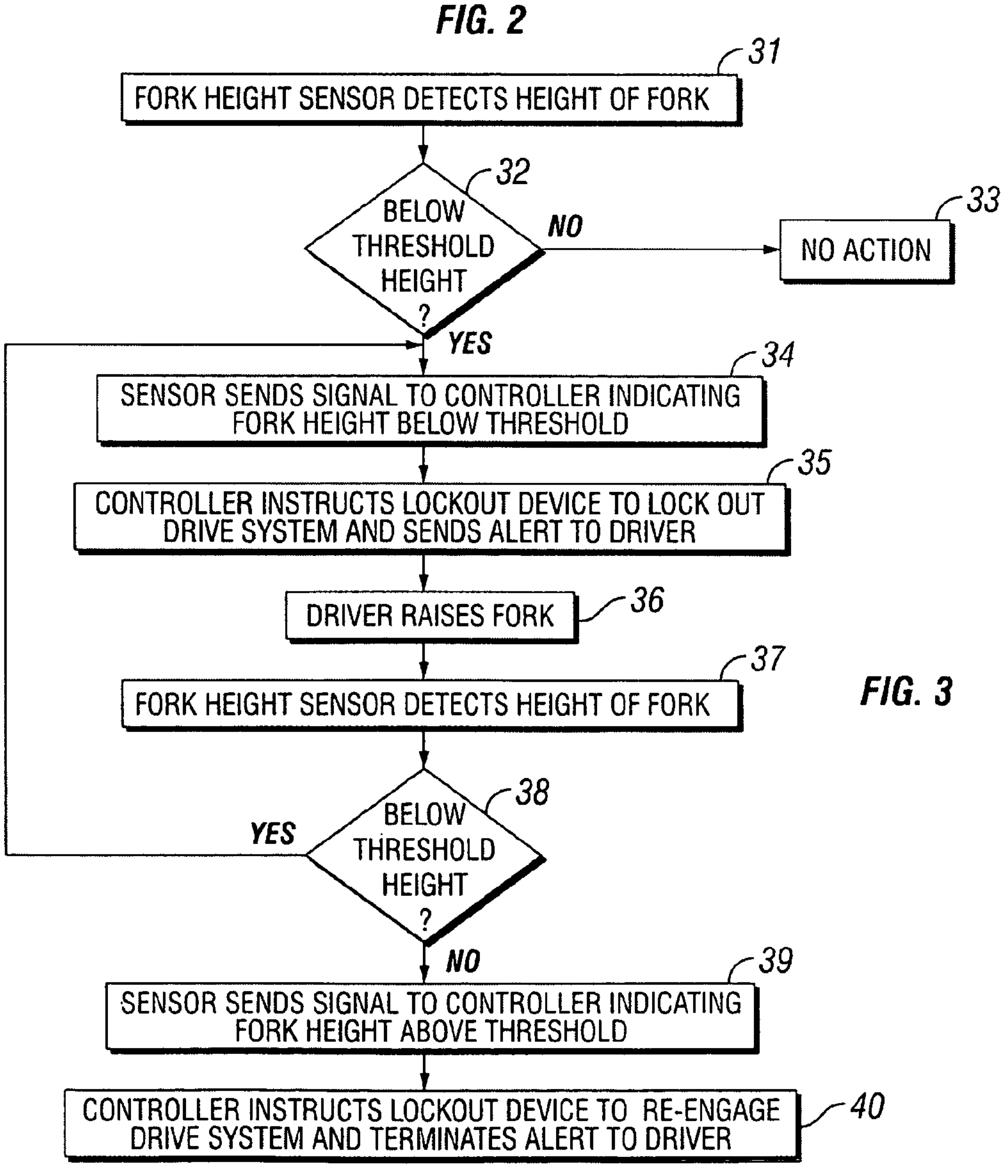
FIG. 3 is a flow chart of the steps performed by the system when performing the method of the present invention.

FIG. 3 is a flow chart of the steps performed by the system when operating in accordance with the teachings of the preferred embodiment of the present invention. With reference to FIGS. 2 and 3, the operation of the present invention will now be described.

At step 31, the fork height sensor 11 detects the height of the fork. At step 32, it is determined whether the height of the fork is below a predefined threshold height. If not, the process moves to step 33 where no action is taken and the forklift continues to operate in a normal manner. However, if the height of the fork is below the threshold height (i.e., the fork is in a position that its tines 15 are in contact with the ground, or are in close proximity to the ground), the process moves to step 34 where the sensor sends a height signal 24 to the system controller 21 indicating that the fork is below the predefined threshold height. At step 35, the controller then sends a lockout signal 25 to the lockout device instructing the lockout device to lock out the drive system 23. For example, the lockout device may disengage the throttle and/or gearbox, or may engage a brake, thereby preventing any forward or reverse movement of the forklift. The controller may also send an alert signal 26 to the driver information panel 19 to warn the driver of the lockout condition. An audible alarm, warning light, or other display may be used to alert the driver to the lockout condition, and to indicate to the driver that the fork must be raised before the forklift will move.

At step 36, the driver raises the fork, and at step 37, the fork height sensor detects the new fork height. At step 38, it is determined whether the height of the fork is still below the threshold height. If the height is still below the threshold height, the process returns to step 34, and the system continues to lock out the drive system. However, if the fork has been raised high enough to be above the threshold height (i.e., the fork heels are no longer touching the ground and optionally are above a safety margin height), the process moves to step 39 where the fork height sensor 11 sends a signal 27 to the controller 21 indicating that the fork has been raised above the threshold height. In response, the controller sends a release signal 28 to the lockout device instructing the lockout device to re-engage the drive system, thereby enabling the driver to accelerate in the forward and/or reverse directions. The controller also terminates the alert signal on the driver information panel 19.

In this way, the present invention provides a forklift safety sensor and control system that prevents unsafe wear on the tines of the fork. By preventing the wear on the tines from ever happening, the problem of excessive wear is eliminated.

It is thus believed that the operation and construction of the present invention will be apparent from the foregoing description. While the system, method, and controller shown and described has been characterized as being preferred, it will be readily apparent that various changes and modifications could be made therein without departing from the scope of the invention as defined in the following claims.

What is claimed is:

1. A control system for preventing wear on a bottom surface of a fork utilized on a vehicle to lift and carry loads, said vehicle including a drive mechanism that causes the vehicle to move relative to the ground, said control system comprising:

a sensor that detects when the fork is at a height at which a bottom surface of the fork is in contact with the ground;

a controller that receives a signal from the sensor indicating that the fork is at the height at which the bottom surface is in contact with the ground; and a lockout device that prevents the drive mechanism from moving the vehicle relative to the ground upon receiving a lockout signal from the controller, said controller sending the lockout signal to the lockout device in response to receiving the signal from the sensor indicating that the fork is at the height at which the bottom surface is in contact with the ground.

2. The control system of claim 1, wherein the sensor is an electrical sensor.

3. The control system of claim 1, wherein the sensor is a magnetic sensor.

4. The control system of claim 1, wherein the sensor is an optical sensor.

5. The control system of claim 1, wherein the sensor is a mechanical sensor.

6. The control system of claim 1, wherein the lockout device includes means for preventing a linkage to a carburetor or fuel injection system from operating.

7. The control system of claim 1, wherein the lockout device includes a mechanical lockout that physically prevents an accelerator pedal from being depressed.

8. The control system of claim 7, wherein the mechanical lockout includes a solenoid controlled by the controller and a locking pin activated by the solenoid that mechanically prevent the accelerator pedal from being depressed.

9. The control system of claim 1, wherein the lockout device includes means for disengaging the vehicle's gearbox.

10. The control system of claim 1, wherein the lockout device includes means for engaging a safety brake that prevents the wheels from turning.

11. The control system of claim 1, further comprising an information panel that includes an alert mechanism for alerting the driver when the lockout device has been engaged.

12. The control system of claim 1, wherein the vehicle is a forklift truck.

13. A method of preventing wear on a bottom surface of a fork utilized on a vehicle to lift and carry loads, said vehicle including a drive mechanism that causes the vehicle to move relative to the ground, said method comprising:

detecting with a sensor when the fork is at a height below a predefined threshold height at which a bottom surface of the fork is in contact with the ground;

sending a signal from the sensor to a controller indicating that the fork is below the predefined threshold height; and preventing the vehicle from moving relative to the ground when the controller receives the signal from the sensor indicating that the fork is below the predefined threshold height.

14. The method of claim 13, wherein the step of preventing the vehicle from moving includes sending a lockout signal from the controller to a lockout device, said lockout device preventing the vehicle from moving relative to the ground.

15. A method of preventing wear on a bottom surface of a fork utilized on a vehicle to lift and carry loads, said vehicle including a drive mechanism that causes the vehicle to move relative to the ground, said method comprising:

detecting with a sensor when the fork is at a predefined threshold height at which a bottom surface of the fork is in close proximity to the ground;

sending a signal from the sensor to a controller indicating that the fork is below the predefined threshold height; and preventing the vehicle from moving relative to the ground when the fork is below the predefined threshold height.

16. A system controller for preventing wear on a bottom surface of a fork utilized on a vehicle to lift and carry loads, said vehicle including a drive mechanism that causes the vehicle to move relative to the ground, said system controller comprising:

means for receiving a height signal from a fork height sensor indicating that the height of the fork is at or below a predefined threshold height at which a bottom surface of the fork is in contact with the ground or is in close proximity to the ground; and means responsive to the height signal for sending a lockout signal to a lockout device that prevents the vehicle from moving relative to the ground;

wherein the vehicle is prevented from moving relative to the ground when the bottom surface of the fork is in contact with, or is in close proximity to, the ground.

17. The system controller of claim 16, further comprising means for sending an alert signal to a driver information panel alerting the driver that the controller is preventing the vehicle from moving until the fork is raised above the predefined threshold height.

18. The system controller of claim 16, further comprising:

means for receiving a second height signal from the fork height sensor indicating that the fork has been raised to a height above the predefined threshold height; and means responsive to the second height signal for sending a release signal to the lockout device enabling the vehicle to move relative to the ground.

* * * * *